(12) United States Patent
Naunheimer et al.

(10) Patent No.: US 8,697,002 B2
(45) Date of Patent: Apr. 15, 2014

(54) LATCH FOR A HYDROPROCESSING VESSEL AND METHOD RELATING THERETO

(75) Inventors: Christopher Naunheimer, Arlington Heights, IL (US); Aziz Sattar, West Chicago, IL (US)

(73) Assignee: UOP LLC, Des Plaines, IL (US)

( * ) Notice: Subject to any disclaimer, the term of this patent is extended or adjusted under 35 U.S.C. 154(b) by 125 days.

(21) Appl. No.: 13/283,400

(22) Filed: Oct. 27, 2011

(65) Prior Publication Data

US 2013/0105502 A1    May 2, 2013

(51) Int. Cl.
*B01J 19/00* (2006.01)
*B01D 3/32* (2006.01)

(52) U.S. Cl.
CPC ............... *B01J 19/006* (2013.01); *B01D 3/32* (2013.01); *B01J 2219/00777* (2013.01)
USPC ............... 422/310; 422/187; 292/34; 292/37; 292/340; 24/458; 29/525.01

(58) Field of Classification Search
CPC ............... B01J 19/0053; B01J 19/006; B01J 2219/00765; B01J 2219/00777
USPC ......... 422/310, 187; 292/34, 37, 340; 24/458; 29/525.01
See application file for complete search history.

(56) References Cited

U.S. PATENT DOCUMENTS

| | | | |
|---|---|---|---|
| 707,858 A * | 8/1902 | Mendenhall | 292/241 |
| 974,650 A * | 11/1910 | Ford | 220/327 |
| 2,105,501 A * | 1/1938 | Parsons | 261/114.4 |
| 2,246,344 A | 6/1941 | Calderwood | |
| 2,515,507 A | 7/1950 | Glitsch | |
| 2,582,826 A * | 1/1952 | Glitsch | 52/246 |
| 2,970,718 A * | 2/1961 | Jennings, Jr. | 220/316 |
| 3,567,263 A * | 3/1971 | McKinney | 292/241 |
| 3,645,574 A | 2/1972 | Scarnato et al. | |
| 3,981,189 A | 9/1976 | Howard et al. | |
| 4,186,952 A | 2/1980 | Glass | |
| 4,207,655 A | 6/1980 | MacMaster | |
| 4,583,775 A | 4/1986 | Bisbing | |
| 4,763,935 A | 8/1988 | Bisbing | |
| 5,123,795 A | 6/1992 | Engel et al. | |
| 5,232,283 A * | 8/1993 | Goebel et al. | 366/336 |

(Continued)

FOREIGN PATENT DOCUMENTS

| | | |
|---|---|---|
| EP | 0 312 381 | 4/1989 |
| GB | 2 156 893 A | 10/1985 |

(Continued)

OTHER PUBLICATIONS

Southco 57 Compression Latch Catalog, Not later than 2011, pp. 71-75.

(Continued)

*Primary Examiner* — Lessanework Seifu
(74) *Attorney, Agent, or Firm* — Mark R Willis

(57) ABSTRACT

One exemplary embodiment may be a latch for a hydroprocessing vessel. The latch may include an elongated substantially cylindrical shaft, a helical pawl coupled to the elongated substantially cylindrical shaft, and a grip coupled to the elongated substantially cylindrical shaft. Usually, the grip forms a polygon having at least three sides and adapted to be engaged by a tool.

12 Claims, 3 Drawing Sheets

(56) References Cited

U.S. PATENT DOCUMENTS

| | | |
|---|---|---|
| 5,518,668 A | 5/1996 | Chresand et al. |
| 6,099,054 A * | 8/2000 | Glass et al. .................. 292/340 |
| 6,237,970 B1 | 5/2001 | Joannou |
| 6,460,834 B2 | 10/2002 | Konijn |
| 6,640,592 B2 | 11/2003 | Vickers |
| 6,676,176 B1 | 1/2004 | Quandt |
| 6,843,082 B2 | 1/2005 | Vickers |
| 6,955,227 B1 | 10/2005 | Motosko |
| 7,049,507 B2 | 5/2006 | Sutehall et al. |
| 7,155,801 B2 | 1/2007 | Hammon et al. |
| 7,276,215 B2 | 10/2007 | Mueller |
| 7,282,118 B2 | 10/2007 | Mitsumoto et al. |
| 7,506,861 B2 | 3/2009 | Mueller |
| 2004/0056488 A1 | 3/2004 | Jackson, Jr. et al. |
| 2004/0103761 A1 | 6/2004 | Pillow |
| 2007/0164560 A1 | 7/2007 | McCarty et al. |
| 2008/0029011 A1 * | 2/2008 | Czarnowski et al. ......... 114/203 |
| 2010/0018010 A1 | 1/2010 | Perrott |
| 2010/0018012 A1 | 1/2010 | Perrott et al. |
| 2010/0019509 A1 | 1/2010 | Perrott |

FOREIGN PATENT DOCUMENTS

| | | |
|---|---|---|
| RU | 2146548 C1 | 3/2000 |
| RU | 2172203 C2 | 8/2001 |
| RU | 2241515 C2 | 12/2004 |
| RU | 2430285 C2 | 9/2011 |
| SU | 203621 A | 12/1967 |

OTHER PUBLICATIONS

U.S. Appl. No. 13/215,828, filed Aug. 23, 2011, by Lesniak, entitled "Clamp for Securing Hydroprocessing Vessel Internals".

* cited by examiner

LATCH FOR A HYDROPROCESSING VESSEL AND METHOD RELATING THERETO

FIELD OF THE INVENTION

This invention generally relates to a latch for a hydroprocessing vessel and a method relating thereto.

DESCRIPTION OF THE RELATED ART

Often vessels, such as reactors, adsorbers, strippers, and distillation columns, utilize trays for gas-liquid contacting in various operations, such as hydroprocessing. The trays can be installed during initial construction of the vessel, as well as removed and reinstalled during maintenance or refurbishing. Various fasteners may be used securing a tray to a support ring positioned along an internal circumference of the vessel. Such fasteners may include one or more bolts, nuts, and/or J-shaped clamps.

However, such fasteners can suffer several disadvantages. Particularly, often a tray may have various tubes, such as downcomers, extending through the tray. As a result, the available space may be limited. As an example, a slotted screwdriver and a wrench are typically used to orientate and secure a J-clip to a tray. Often, space is limited interfering with the ability to rotate the wrench inside of the vessel. Due to the space limitations, the fastening of the J-clip to a support ring for securing the tray can be a time consuming process. Accordingly, it is desirable to provide an alternative fastening mechanism that can be used within a space constrained area and may minimize the number of tools required to secure a tray to a vessel.

SUMMARY OF THE INVENTION

One exemplary embodiment may be a latch for a hydroprocessing vessel. The latch may include an elongated substantially cylindrical shaft, a helical pawl coupled to the elongated substantially cylindrical shaft, and a grip coupled to the elongated substantially cylindrical shaft. Usually, the grip forms a polygon having at least three sides and adapted to be engaged by a tool.

Another exemplary embodiment can be a hydroprocessing vessel. Usually, the hydroprocessing vessel includes an enclosure defining an interior volume, at least one internal structure, a member, and a latch having an elongated substantially cylindrical shaft coupled to a helical pawl for engaging and disengaging the member from the at least one internal structure.

A further exemplary embodiment may be a method of latching a member to an internal structure of a hydroprocessing vessel. The method can include coupling a helical pawl of a latch to the internal structure. Typically, the helical pawl has a first position disengaged with the internal structure and a second position engaged with the internal structure.

The embodiments disclosed herein provide a latch that allows the simple fastening of a tray to a vessel. Generally, the latch can include a helical or spiral pawl for securing the tray to the vessel. A protrusion on an end can be adapted to correspond with a tool, such as an extension for a ball-and-socket wrench to allow rotation of the latch within constrained spaces of a vessel to secure or release the tray by engaging or disengaging the latch.

DEFINITIONS

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g., a screw, a nail, a staple, or a rivet; an adhesive; or a solder.

As used herein, the terms "absorbent" and "absorber" include, respectively, an adsorbent and an adsorber, and relates, but is not limited to, absorption, and/or adsorption.

As used herein, the term "vapor" can mean a gas or a dispersion that may include or consist of one or more hydrocarbons.

DETAILED DESCRIPTION

Figure 1:
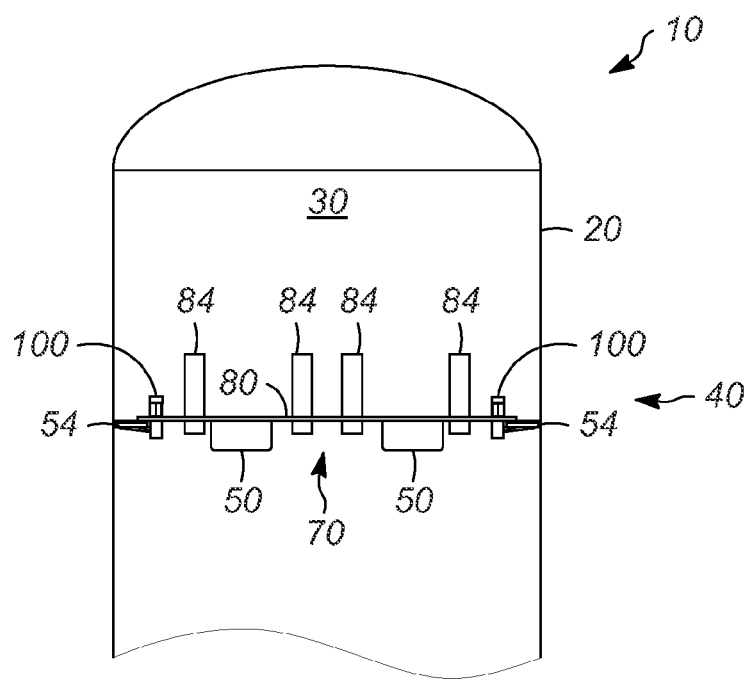
FIG. 1 is a cross-sectional, schematic depiction of a portion of an exemplary vessel.

Referring to FIG. 1, an exemplary vessel 10 can be utilized in any suitable hydrocarbon refining process, such as hydroprocessing. Generally, the vessel 10 can be a reactor, an adsorber, a stripper, a distillation column, or any other suitable vessel utilized in, e.g., hydroprocessing operations. Often, such a vessel 10 can facilitate mass transfer operations in downflow, upflow, co-current flow, and counter-current flow for one or more fluids, such as a gas, a liquid, and/or a mixed phase of a gas and a liquid, such as a dispersion.

The vessel 10 can include an enclosure 20 having one or more side walls defining an interior volume 30. Often, at least one internal structure 40 can be located inside of the vessel 10. As depicted in FIG. 1, the at least one internal structure 40 can include beams 50, a support ring 54, and a member 70. In this exemplary embodiment, the member 70 can include a tray 80 having one or more downcomers 84. Often, gas can flow downward through the downcomers with liquid collecting on the tray 80. Although not depicted, apertures in the tray 80 can allow liquid to pass there-through. In addition, in some operations gas may pass upwards. Two latches 100 can secure the tray 70 to the support ring 54.

Figure 2:
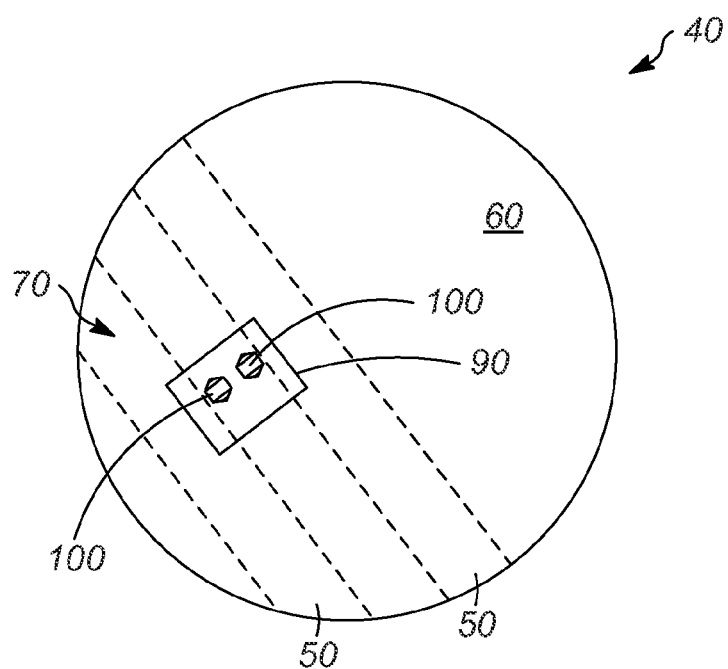
FIG. 2 is a top, plan view of an exemplary platform in the exemplary vessel.

Referring to FIG. 2, a platform 60 is depicted positioned at another elevation within the vessel 10. The platform 60 is not depicted in FIG. 1 of the vessel 10. At this location, at least one internal structure 40 can include the platform 60 that can be positioned inside of the vessel 10 and be used instead or in conjunction with the tray 80 depicted in FIG. 1. In this exemplary embodiment, the platform 60 can be substantially circular forming a rectangular opening for positioning a member 70, in this instance a man-way cover 90 positioned over beams 50, therein. The man-way cover 90 can straddle beams 50 and be secured with the latches 100. As the latches 100 can be substantially similar, only one latch 100 will be described hereinafter with respect to the tray 80, although the latch 100 may also be similarly utilized with the man-way cover 90, as depicted in FIG. 2.

Referring to FIGS. 3-6, a latch 100 can include an elongated substantially cylindrical shaft 120 coupled to a helical or spiral pawl 140. In addition, a grip 160 can be coupled to the elongated substantially cylindrical shaft 120 on an upper end 150, and in turn, be coupled with a protrusion 170. The protrusion 170 can be substantially wedge-shaped, although the protrusion 170 can form any suitable shape. The grip 160 may form a polygon having at least three sides, and in this exemplary embodiment, have a perimeter substantially being a hexagon. Generally, the grip 160 can be adapted to be engaged by any suitable tool, such as a wrench, pliers, and an extension for a ball-and-socket wrench.

The helical pawl 140 can be used for engaging and disengaging a member, such as the tray 80, and may extend or at least partially spiral no more than about 180 degrees, optionally no more than about 120 degrees or about 100 degrees, about the circumference of the elongated substantially cylindrical shaft 120. Desirably, the helical pawl 140 has a rise of no more than about 30 degrees from a lower end 144 to an upper end 148. This allows an upper face of the helical pawl 140 to slide up against the underside of the tray 80.

Figure 3:
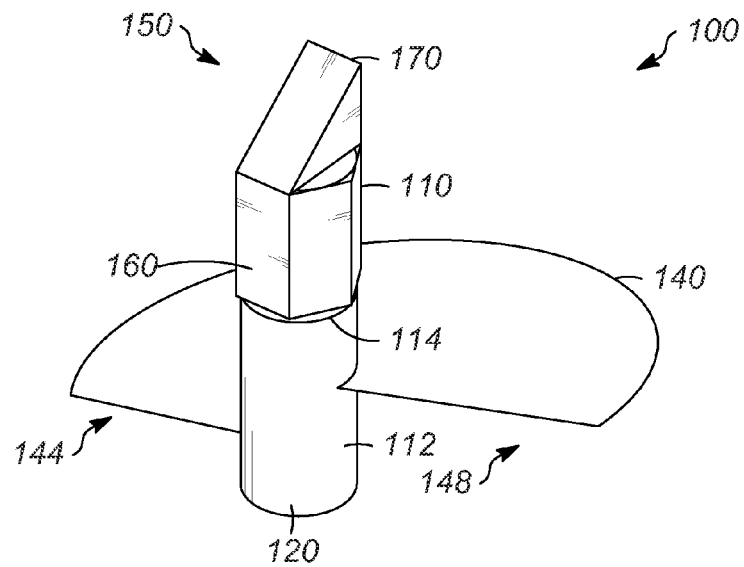
FIG. 3 is a perspective view of an exemplary latch.
Figure 4:
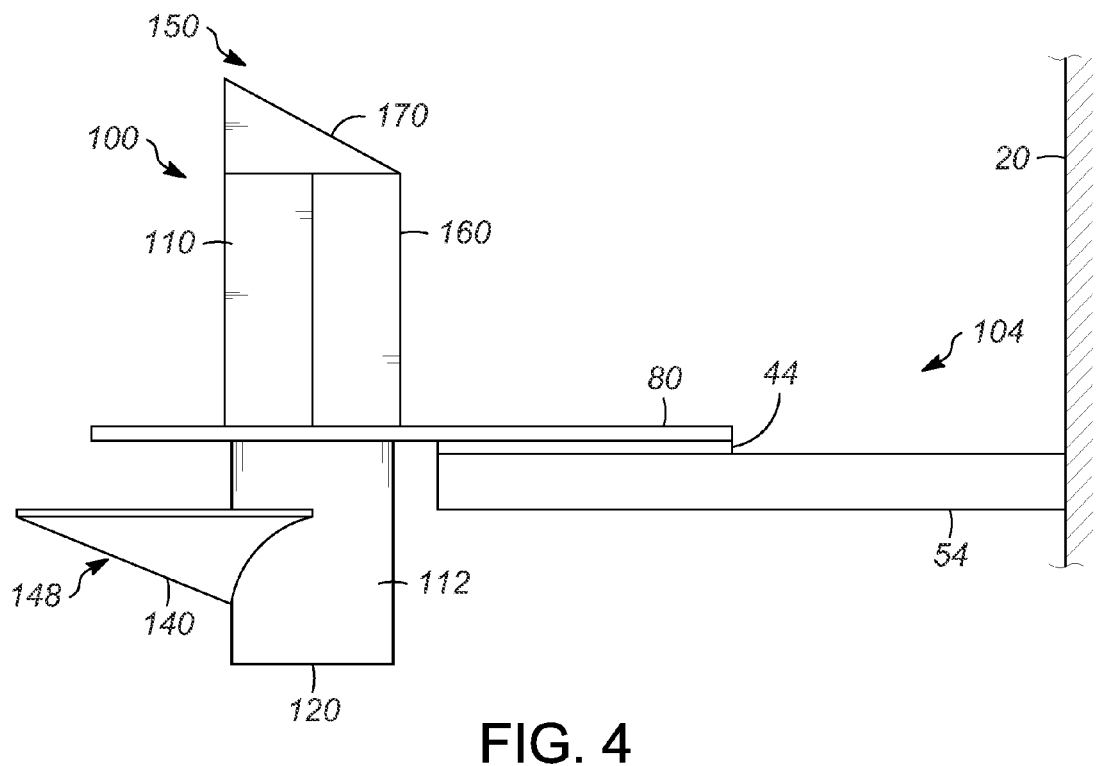
FIG. 4 is a side, elevational view of the exemplary latch.
Figure 5:
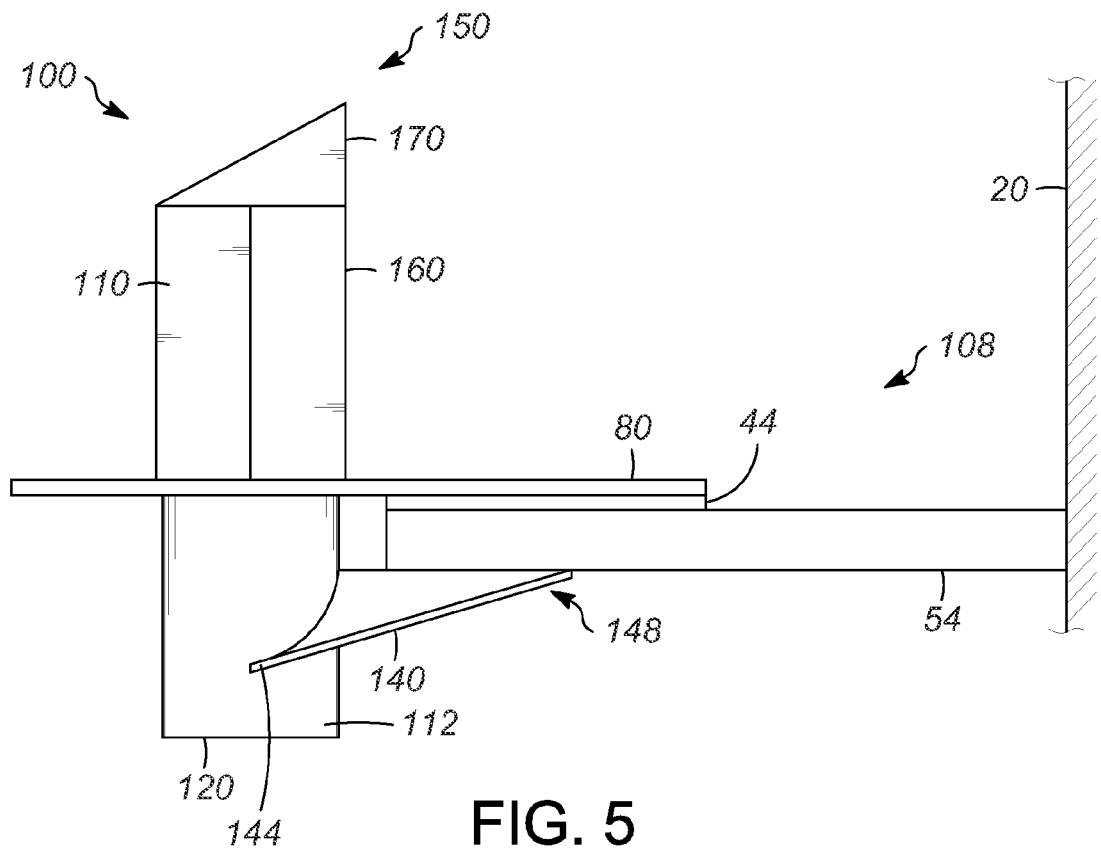
FIG. 5 is another side, elevational view of the exemplary latch.
Figure 6:
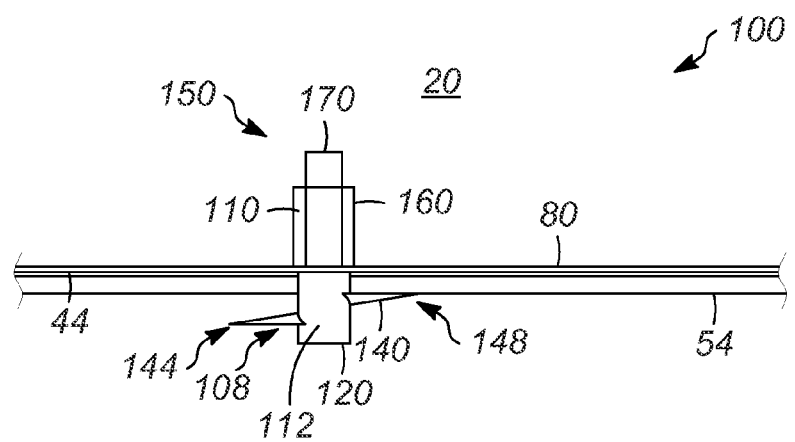
FIG. 6 is a back, elevational view of the exemplary latch of FIG. 5.

Referring to FIGS. 3-5, the latch 100 can form two pieces 110 and 112 corresponding at a seam 114 with each piece 110 and 112 inserted through a hole from opposing sides of the tray 80. The first piece 110 including the grip 160 and the protrusion 170 may be inserted downward through the hole and the second piece 112 including the elongated substantially cylindrical shaft 120 and the helical pawl 140 may be inserted upward through the hole. The first and second pieces can be coupled using any suitable connection, such as threads, press-fits, or welds, to form a unitary piece as depicted in FIGS. 4-6. The seam 114 may be obscured by the tray 80 in FIGS. 4-6. Generally, the grip 160 has a larger circumference than the hole to prevent the latch 100 from falling therethrough.

The latch 100 can have a first position 104 disengaged from the tray 80, as depicted in FIG. 4, and a second position 108 engaged with the tray 80, as depicted in FIG. 5. Utilization of a hand or any suitable tool, such as an extension for a ball-and-socket wrench, can be applied to the grip 160 to rotate the latch 100, as depicted in FIG. 4, about 180 degrees clockwise to position the helical pawl 140 underneath the support ring 54 of the vessel 100. Although in this exemplary embodiment the latch 100 is rotated about 180 degrees, any suitable path of rotation may be utilized, such as about 30- about 540 degrees, preferably about 90- about 270 degrees. The protrusion 170 can indicate the position of the latch 100 by pointing away from the wall 20, as depicted in FIG. 5, when the upper end 148 of the pawl 140 engages the underside of the support ring 54.

As depicted in FIG. 6, the helical pawl 140 of the latch 100 can reside completely underneath the support ring 54. Optionally, a gasket 44, as shown in FIGS. 4-6, can be positioned between the tray 80 and the support ring 54 to allow some resiliency between the support ring 54 and the tray 80 to secure them thereto.

The latch 100 can be manufactured from any suitable material depending on the conditions within the vessel 10. Such suitable materials can include carbon steel, stainless steel, and titanium. The gasket 44 can be manufactured from any suitable material, such as rubber, synthetic plastic, or heat resistant fiber, such as one or more ceramic fibers.

Thus, the latch 100 allows the securing of the tray 80 within the vessel 10. Reversing the positioning of the latch 100 by about 90 degrees as depicted in FIG. 4 can allow the removal of the tray from the vessel 100 for, e.g., maintenance or refurbishment. The protrusion 170 can indicate the disengaged position by pointing towards the wall 20. It should be understood that the protrusion 170 can be modified so pointing towards the wall 20 indicates engagement and pointing away from the wall indicates disengagement of the latch 100.

In addition, the grip 160 being a polygon with at least three sides may correspond to a suitable tool, such as a wrench or pliers. Thus the installation of members, such as trays and man-way covers, inside a vessel can be hastened and thus time spent offline or during installation of the trays may be minimized. Moreover, such a latch can ease operation, and thus minimize potential injuries.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A hydroprocessing vessel, comprising:
   A) an enclosure defining an interior volume;
   B) at least one internal structure comprising a support ring;
   C) a member comprising a tray, wherein the tray is adapted to be installed and removed from the vessel; and
   D) a latch comprising an elongated substantially cylindrical shaft coupled to a helical pawl for engaging and disengaging the tray from the support ring,
   wherein the helical pawl extends no more than about 120 degrees around a circumference of the elongated substantially cylindrical shaft; and
   wherein the helical pawl is adapted to slide against an underside of the support ring to secure the tray to the support ring.

2. The vessel according to claim 1, wherein the at least one internal structure further comprises a beam.

3. The vessel according to claim 2, wherein a gasket is positioned between the beam and the tray.

4. The vessel according to claim 2, wherein the tray further comprises one or more downcomers.

5. The vessel according to claim 1, wherein the helical pawl extends no more than about 100 degrees around a circumference of the elongated substantially cylindrical shaft.

6. The vessel according to claim 1, wherein the helical pawl has a rise of no more than about 30 degrees.

7. The vessel according to claim 1, wherein the latch further comprises a grip forming a protrusion for indicating engagement or disengagement of the latch.

8. A method of latching tray to a support ring of a hydroprocessing vessel, comprising:
   coupling a helical pawl of a latch to the support ring, wherein the latch further comprises an elongated substantially cylindrical shaft coupled to the helical pawl, wherein the helical pawl has a first position disengaged with the support ring and a second position engaged with the support ring, wherein the helical pawl forms at least a portion of a helix extending no more than about 120 degrees around a circumference of the elongated substantially cylindrical shaft, and wherein the helical pawl is adapted to slide against an underside of the support ring to secure the tray to the support ring.

9. The method according to claim 8, wherein the tray comprises one or more downcomers.

10. The method according to claim 8, wherein the helical pawl forms at least a portion of a helix extending no more than about 100 degrees around a circumference of the elongated substantially cylindrical shaft.

11. The method according to claim 8, wherein the elongated cylindrical shaft is coupled to a grip forming a polygon having at least three sides and adapted to be engaged by a tool.

12. The method according to claim 11, wherein the grip forms a hexagon adapted to be engaged by a wrench.

\* \* \* \* \*